2,867,520

1-(CHLORARYL) 3-ALKYL 3-ALKYNYL UREA

David J. Beaver, Richmond Heights, Philip C. Hamm, Webster Groves, and Paul J. Stoffel, St. Louis, Mo., assignors to Monsanto Chemical Company, St. Louis, Mo., a corporation of Delaware No Drawing. Application November 23, 1956
Serial No. 623,759

6 Claims. (Cl. 71—2.6)

This invention relates to new and useful 1-(chloraryl) 3-alkyl 3-alkynyl ureas, specifically those of the structure $$Cl_nC_6H_{5-n}-NH-\underset{\underset{O}{\|}}{C}-N\begin{matrix}CH(CH_3)_2\\ \\CH_2C\equiv CH\end{matrix}$$

where $Cl_nC_6H_{5-n}-$ is a chlorine substituted phenyl radical free of substituents ortho to the nitrogen atom and where $n$ is a whole number from 2 to 3. As illustrative of the new compounds is the following:

1-(3,4-dichlorophenyl) 3-isopropyl 3-(2-propynyl) urea
1-(3,5-dichlorophenyl) 3-isopropyl 3-(2-propynyl) urea
1-(3,4,5-trichlorophenyl) 3-isopropyl 3-(2-propynyl) urea As illustrative of the preparation of the new compounds of this invention is the following:

Example I

In a suitable reaction vessel is added and mixed at room temperature approximately 4.9 parts by weight of N-(2-propynyl) isopropyl amine, approximately 9.4 parts by weight of 3,4-dichlorophenylisocyanate, and approximately 15 parts by weight diethyl ether. The mass is agitated at room temperature for about two hours and filtered. The filter cake is air dried. Upon taking up the dried cake in an equi-mixture of hot heptane and hot ethanol following by cooling the solution, filtering and drying, there is obtained 1-(3,4-dichlorophenyl) 3-isopropyl 3-(2-propynyl) urea, a white solid melting at 84.4–85.1° C.

Example II

Employing the procedure of Example I but replacing 3,4-dichlorophenylisocyanate with an equal weight of 3,5-dichlorophenylisocyanate, there is obtained 1-(3,5-dichlorophenyl) 3-isopropyl 3-(2-propynyl) urea.

Example III

Employing the procedure of Example I but replacing 3,4-dichlorophenylisocyanate with a chemically equivalent weight of 3,4,5-trichlorophenylisocyanate, there is obtained 1-(3,4,5-trichlorophenyl) 3-isopropyl 3-(2-propynyl) urea.

As contact herbicides the compounds of this invention are highly effective, and to illustrate their activity against narrow-leaf plants 1-(3,4-dichlorophenyl) 3-isopropyl 3-(2-propynyl) urea was compared to 1-(3,4-dichlorophenyl) 3-isopropyl 3-(2-propynyl) thiourea [a white solid melting at 77.2–77.8° C. prepared from 3,4-dichlorophenylisothiocyanate and N-(2-propynyl) isopropyl amine by reacting same in substantially equimolecular proportions at room temperature using heptane as the solvent] and to 1-(3,4-dichlorophenyl) 1-allyl 1-isopropyl urea [a colorless solid melting at 84.0–84.5° C. prepared from 3,4-dichlorophenylisocyanate and N-allyl isopropyl amine by reacting same in substantially equimolecular proportions at room temperature employing heptane as the solvent], a known herbicide, by preparing acetone solutions of each and suspending same in water containing a dispersing agent, the quantity of solution employed being calculated to give sprays of the concentrations set forth below. The respective sprays were applied to ten day old greenhouse flats containing a variety of narrow-leaf plants until droplets formed on and/or fell from the foliage and stems of the sprayed plants. The sprayed plants were then allowed to remain under standard conditions of sunlight and watering for a period of ten days. At the end of that time the sprayed plants were compared in order to determine the extent of injury, if any. The following observations were made:

| Compound tested at percent concentration [1] | Extent [2] of injury on narrow-leaf plants [3] |
|---|---|
| 1-(3,4-dichlorophenyl) 3-isopropyl 3-(2-propynyl) urea: | |
| 0.05 | 4 |
| 0.05 | 4 |
| 1-(3,4-dichlorophenyl) 3-isopropyl 3-(2-propynyl) thiourea: | |
| 0.05 | 0 |
| 0.05 | 0 |
| 1-(3,4-dichlorophenyl) 3-isopropyl 3-allyl urea: | |
| 0.05 | 0 |
| 0.05 | 1 |

[1] Solution of concentration of 0.05% applied at one pound per acre.
[2] 4=plants dead; 3=severe injury; 2=moderate injury; 1=slight effect; 0=no effect.
[3] Narrow-leaf plants included wild oat, brome grass, rye grass and foxtail.

In addition to narrow-leaf plants the instant compounds are useful against broad-leaf plants, especially buckwheat, radish, sugar beet, and the like.

Herbicidal compositions containing the present compounds may be aqueous suspensions or oil-in-water emulsions of the compounds, but preferably aqueous suspensions containing a phytotoxic amount of the new herbicidal agents. The aqueous suspension may be obtained simply by dissolving them in effective proportions in a suitable organic solvent and dispersing the solution in water employing a wetting agent. Dispersing or emulsifying agents such as the alkyl aryl sulfonates and the polyethylene glycol derivatives are advantageously employed in the preparation of the herbicidal suspensions or emulsions and a wetting or penetrating agent is desirable for simple aqueous suspensions. The present compounds are preferably applied by spraying aqueous suspensions or oil emulsions of the same, this method affording an easy and inexpensive way of destroying plant growth. For general utility aqueous suspensions in concentrations of 0.01 to 10 parts of the new contact herbicides per 100 parts water may be employed, and in this manner an acre may be freed of undesirable vegetation by application thereto of only a few pounds of the new contact herbicides. These new herbicidal agents are relatively inactive with respect to corn, and, thusly, are advantageously employed in ridding fields of growing corn of noxious vegetation.

Because of the high herbicidal activity of the present compounds, they are advantageously applied by mixing them with inert ingredients as carriers. Valuable herbicidal compositions are prepared by incorporating small amounts of the compounds into such carriers as water, hydrocarbon oils, organic solvents, dusts such as bentonite, pumice, etc. Sprays may also be prepared by dissolving the chemicals in oils or organic solvents to make concentrates and then adding small amounts of the concentrates to water advantageously in the presence of an emulsifying or dispersing agent. Emulsions and dispersions thus prepared have the property of adhering to the plant foliage for a long period of time.

While this invention has been described with respect to certain embodiments, it is not so limited and it is to be

What is claimed is:

1. Compounds of the structure

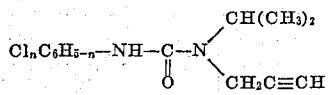

wherein $Cl_nC_6H_{5-n}-$ is a chlorine substituted phenyl radical free of substituents ortho to the nitrogen atom and where $n$ is a whole number from 2 to 3.

2. 1-(3,4-dichlorophenyl) 3-isopropyl 3-(2-propynyl) urea.

3. 1-(3,5-dichlorophenyl) 3-isopropyl 3-(2-propynyl) urea.

4. 1-(3,4,5-trichlorophenyl) 3-isopropyl 3-(2-propynyl) urea.

5. A herbicidal composition comprising an inert carrier, and as the essential active ingredient a compound of claim 1 in an amount sufficient to exert herbicidal action.

6. A herbicidal composition comprising an inert carrier, and as the essential active ingredient the compound of claim 2 in an amount sufficient to exert herbicidal action.

References Cited in the file of this patent
UNITED STATES PATENTS 2,723,192    Todd ------------------ Nov. 8, 1955

FOREIGN PATENTS 38,492    Australia ---------------- Feb. 8, 1951

OTHER REFERENCES

Gardner et al.: Journal of the Chemical Society (1949), pages 781–782 relied on.